US009694237B2

(12) United States Patent
Palmenco-Geller et al.

(10) Patent No.: US 9,694,237 B2
(45) Date of Patent: Jul. 4, 2017

(54) BUTTERFLY CLIP-ON FINGER WEIGHT DEVICE

(71) Applicants: Gemma Palmenco-Geller, Round Lake, IL (US); Jason M. Geller, East Dundee, IL (US); Pamela J. Caplan, Hawthorn Woods, IL (US)

(72) Inventors: Gemma Palmenco-Geller, Round Lake, IL (US); Jason M. Geller, East Dundee, IL (US); Pamela J. Caplan, Hawthorn Woods, IL (US)

(73) Assignee: Andrew Gellar, Round Lake, WI (US)

( * ) Notice: Subject to any disclaimer, the term of this patent is extended or adjusted under 35 U.S.C. 154(b) by 0 days.

(21) Appl. No.: 14/745,729

(22) Filed: Jun. 22, 2015

(65) Prior Publication Data

US 2015/0375038 A1    Dec. 31, 2015

Related U.S. Application Data

(60) Provisional application No. 62/017,966, filed on Jun. 27, 2014.

(51) Int. Cl.
| A63B 23/16 | (2006.01) |
| A63B 21/02 | (2006.01) |
| F16B 2/10 | (2006.01) |
| A63B 21/04 | (2006.01) |
| A63B 21/045 | (2006.01) |

(Continued)

(52) U.S. Cl.
CPC ............ *A63B 23/16* (2013.01); *A63B 21/025* (2013.01); *A63B 21/026* (2013.01); *A63B 21/045* (2013.01); *A63B 21/0421* (2013.01); *A63B 21/065* (2013.01); *A63B 21/4019* (2015.10); *A63B 21/4023* (2015.10); *A63B 21/4035* (2015.10); *A63B 21/4039* (2015.10); *A63B 23/03508* (2013.01); *F16B 2/10* (2013.01);

(Continued)

(58) Field of Classification Search
CPC ......... A63B 23/16; A63B 23/14; A63B 21/06; A63B 21/0615; A63B 21/045; A63B 21/0455; A63B 23/129; A63B 21/065; A63B 21/1438; F16B 2/10
USPC ................. 482/44–50, 92, 148, 121, 127
See application file for complete search history.

(56) References Cited

U.S. PATENT DOCUMENTS 4,039,183 A * 8/1977 Sakurada ............... A63B 23/14
                                                    482/127
4,456,002 A * 6/1984 Barber ..................... A61F 5/10
                                                    482/44

(Continued)

*Primary Examiner* — Stephen Crow
*Assistant Examiner* — Garrett Atkinson
(74) *Attorney, Agent, or Firm* — Adam K. Sacharoff; Much Shelist, PC

(57) ABSTRACT

A finger weight device is provided with two arcuate jaws. Each jaw having a lower portion with tines extending therefrom and are connected together at an upper portion by a hinge. The jaws have an inwardly facing surface configured to enclose around a finger of a person. A spring is configured to urge the tines towards each other such that the inwardly facing surface of the jaws secure the device about the finger. Each jaw has an handle extending from the upper portion, which when moved towards each other causes the tines to separate from each other. At least one weight receiving portion, and at least one weight corresponding to the receiving portion is provided for adding a desired weight to the device.

5 Claims, 6 Drawing Sheets

(51) Int. Cl.
    *A63B 21/00*    (2006.01)
    *A63B 21/065*   (2006.01)
    *A63B 23/035*   (2006.01)
    *A63B 21/075*   (2006.01)

(52) U.S. Cl.
    CPC ....... *A63B 21/00065* (2013.01); *A63B 21/075* (2013.01)

(56) References Cited

U.S. PATENT DOCUMENTS

| | | | | |
|---|---|---|---|---|
| 5,052,086 A * | 10/1991 | Nasuno | ............... | A01G 9/128 24/489 |
| 5,113,849 A * | 5/1992 | Kuiken | ............... | A63B 21/026 601/40 |
| 5,350,092 A * | 9/1994 | Hollis | ............... | A47G 25/485 223/85 |
| 5,803,096 A * | 9/1998 | Lee | ............... | A45D 8/20 132/276 |
| 6,135,125 A * | 10/2000 | Sartena | ............... | A45D 8/20 132/275 |
| 6,273,097 B1 * | 8/2001 | Sartena | ............... | A41G 5/00 132/275 |
| 6,422,975 B1 * | 7/2002 | Chermak | ............... | A61F 5/013 482/127 |
| 6,569,066 B1 * | 5/2003 | Patterson | ............... | A63B 21/0552 482/106 |
| 7,044,141 B2 * | 5/2006 | Yasuda | ............... | A45D 8/24 132/277 |
| 7,794,369 B1 * | 9/2010 | Rivera, III | ............... | A63B 5/20 482/81 |
| 2005/0218090 A1 * | 10/2005 | Sepanek | ............... | A45D 44/02 211/13.1 |
| 2009/0223533 A1 * | 9/2009 | Daley | ............... | A45D 2/42 132/211 |
| 2010/0197470 A1 * | 8/2010 | Hartman | ............... | A63B 21/4017 482/139 |
| 2011/0277276 A1 * | 11/2011 | Pucci | ............... | A44B 9/20 24/3.3 |
| 2012/0108404 A1 * | 5/2012 | Savarino | ............... | A63B 21/023 482/121 |
| 2012/0208683 A1 * | 8/2012 | Hartman | ............... | A63B 15/00 482/139 |
| 2013/0012358 A1 * | 1/2013 | Lynn | ............... | A63B 23/16 482/8 |

* cited by examiner

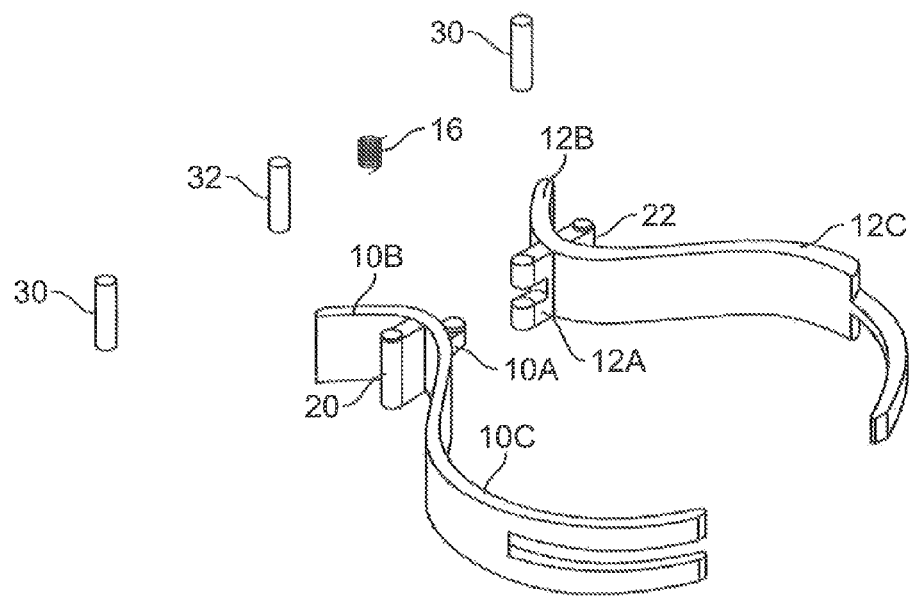
FIG. 6A
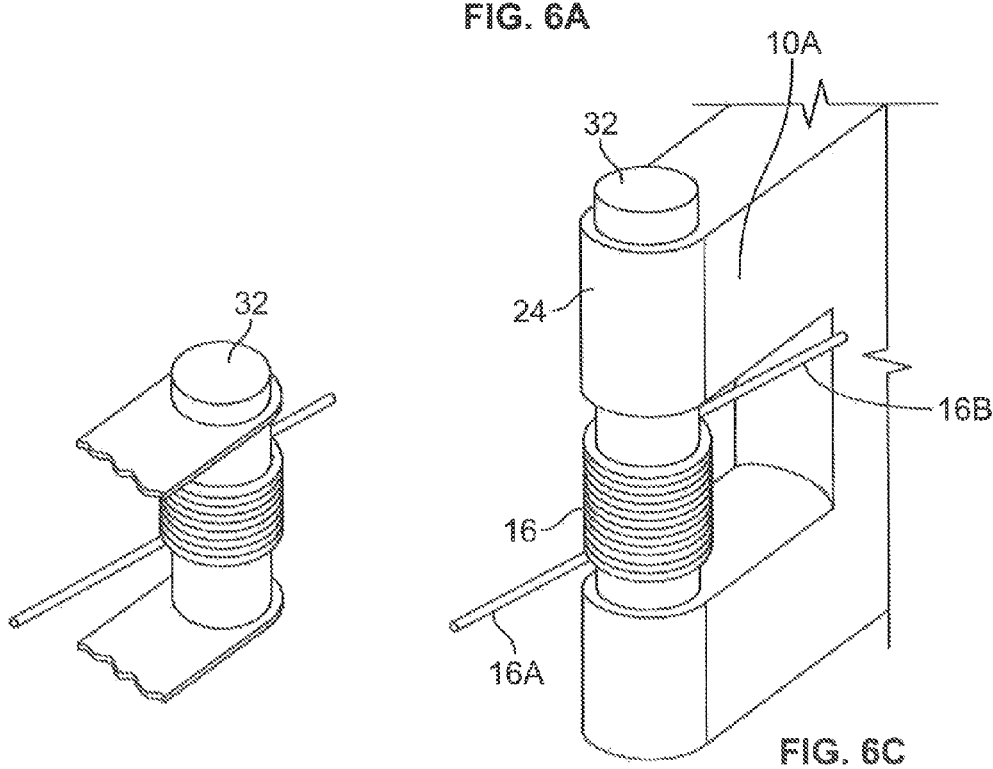
FIG. 6B
FIG. 6C

BUTTERFLY CLIP-ON FINGER WEIGHT DEVICE

CROSS REFERENCE OF THE INVENTION

The present invention claims priority to provisional application 62/017,966 filed Jun. 27, 2014.

BACKGROUND OF THE INVENTION

The present invention relates to a device that is weighted and resiliently securable to a finger to assist in strengthening the finger during use of the finger. Such a strengthening device is invaluable for sports usage, piano playing and other activities where fingers are in constant use and thus in need of strengthening.

DESCRIPTION OF THE PRIOR ART

There are a number of finger weight devices capable of holding a plurality of weights for strengthening fingers. These include U.S. Pat. Nos. 6,413,193 and 7,662,068. These devices while effective require the use of a strap and do not have the desirable flexibility so they can be quickly and effortlessly affixed in position on a figure or removed therefrom. In addition to this high degree of flexibility they lack the ready positioning and removable of weights so that they can readily adapt to varying weight requirements.

SUMMARY OF THE INVENTION

In accordance with the present invention there is illustrated a butterfly style clip which is designed to readily closely connect the clip to a finger which clip is provided with weight holding portions to vary the weight of the finger weight device. The butterfly aspect of clip permits the clip to accommodate any size finger with ease. The outer portion of the clip is designed to accommodate one or more cylindrical, rectangular or other cross-sectional design weights that when located in place extend parallel to the finger. The clip is provided with weight holding devices that are secured to the upper portions of the butterfly clip. The weights are snuggly held in their holders to prove them from being displaced during movement of the fingers.

It can be appreciated that this simple and efficient design will not restrict circulation thus allowing the wearer to use the device for an extended period of time without discomfort.

It is unique to use a butterfly, spring biased device that is held in a gripping position by a spring located on a pin pivotally interconnecting the two halves of the clip. The ends of act against opposed upper flanges of the clip to bias the generally semi-cylindrical opposed lower portions to fit about a finger. Each of the lower portions of the clip define interfitting finger portions to facilitate holding the clip in a gripping position about the finger on which it has been placed.

The clip and associated weight holding portions can be made of a variety of materials an example of which is a relatively hard plastic.

BRIEF DESCRIPTION OF THE DRAWINGS

To obtain a better understanding of the invention, reference is made to the accompanying drawings illustrating the invention in which:

FIGS. 6A, 6B, and 6C illustrate a device clip incorporating weight holder portions.

DETAILED DESCRIPTION OF THE DRAWINGS

Figure 1A:
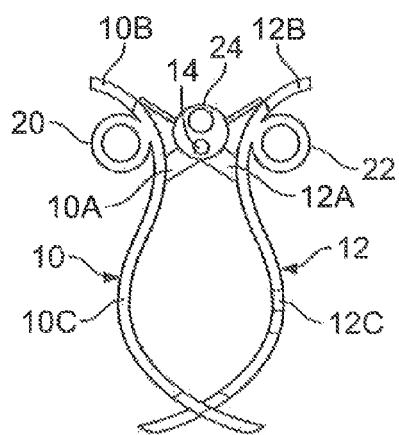
FIGS. 1A, 1B, 1C and 1D are front, side, perspective and plan views of the butterfly clip incorporation three longitudinally weight holding portions.
Figure 1B:
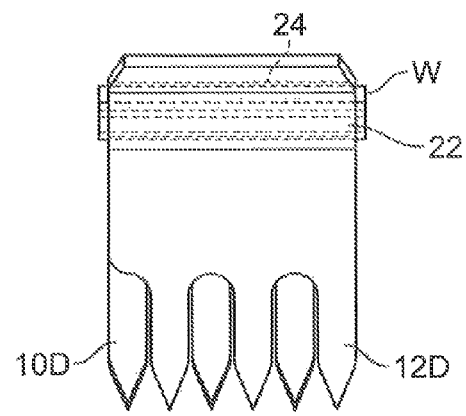
Figure 1C:
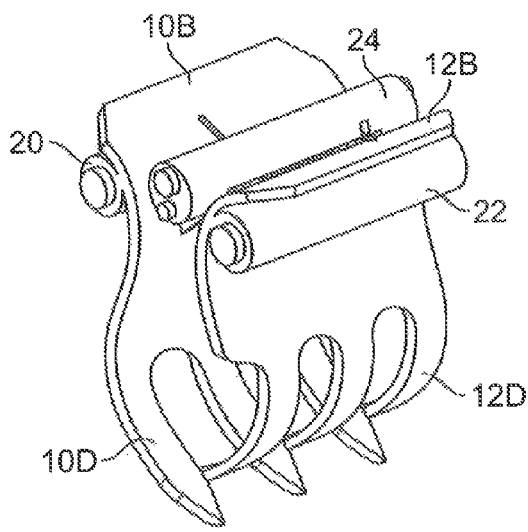
Figure 1D:
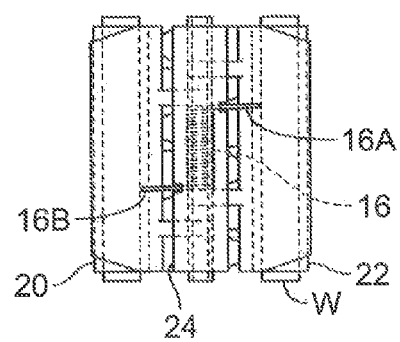
Figure 2A:
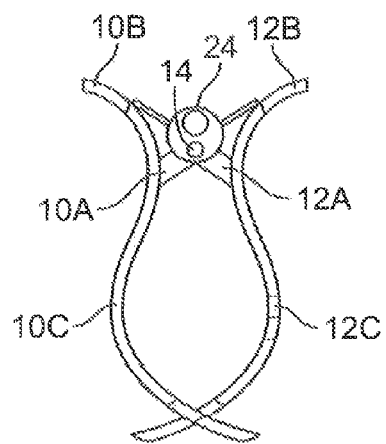
FIGS. 2A, 2B, 2C and 2D are similar to FIGS. 1A, 1B, 1C and 1D but they only employ a single weight holding segment located above the pivoted hinge position of the butterfly clip.
Figure 2B:
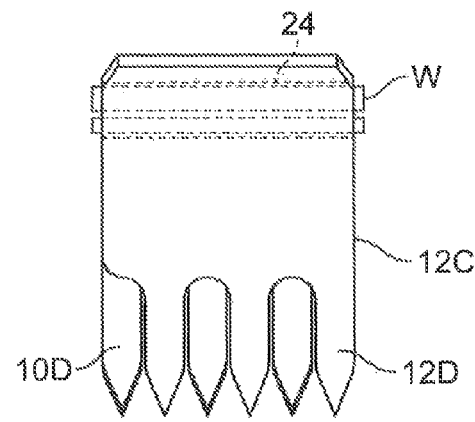
Figure 2C:
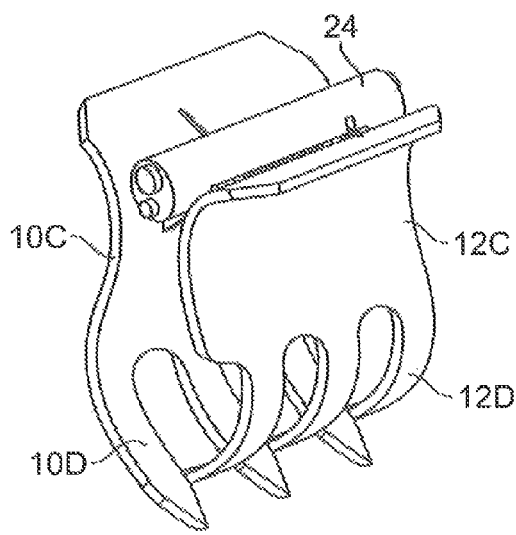
Figure 2D:
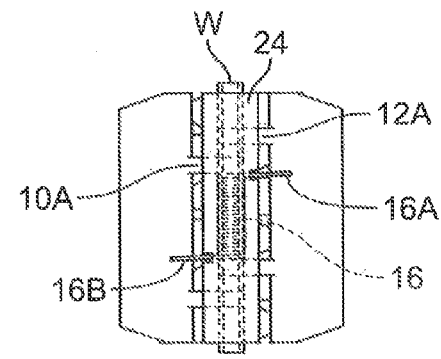
Figure 3A:
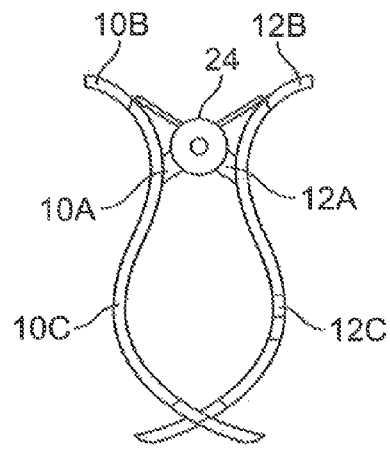
FIGS. 3A, 3B, 3C and 3D are similar to FIGS. 2A, 2B, 2C and 2D with the weight holder located in the hinge area of the clip.
Figure 3B:
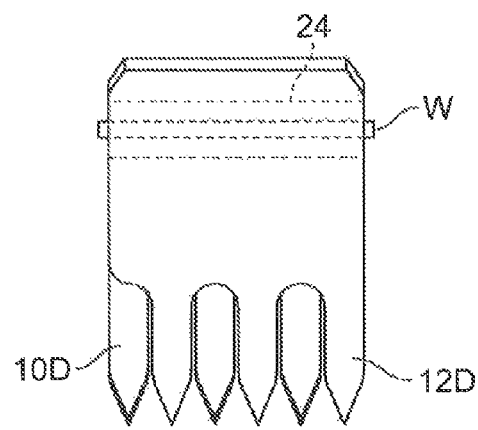
Figure 3C:
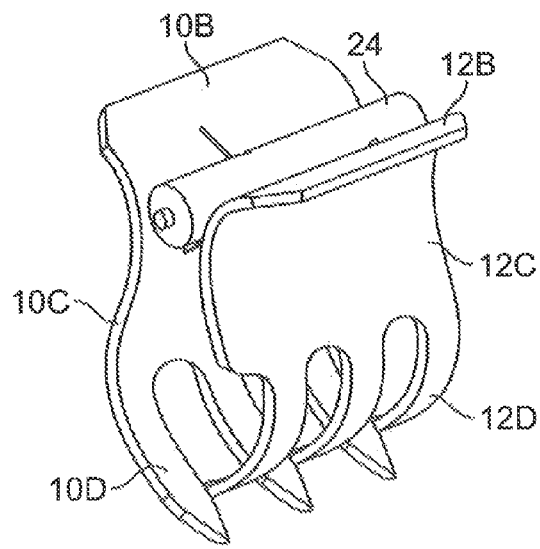
Figure 3D:
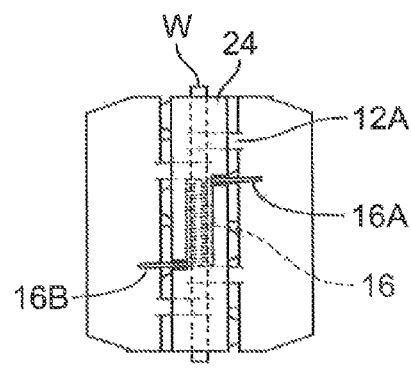
Figure 4A:
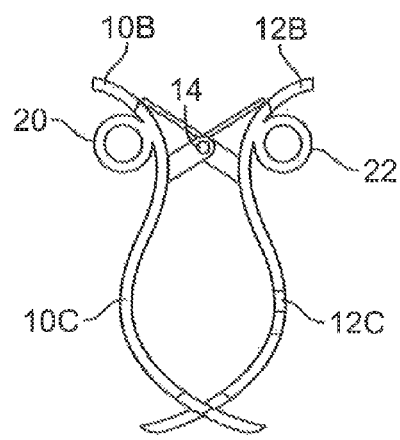
FIGS. 4A, 4B, 4C and 4D show a device similar that shown in FIGS. 1A, 1B, 1C and 1D with weight holders formed integrally with the upper outer walls of the clip portions.
Figure 4B:
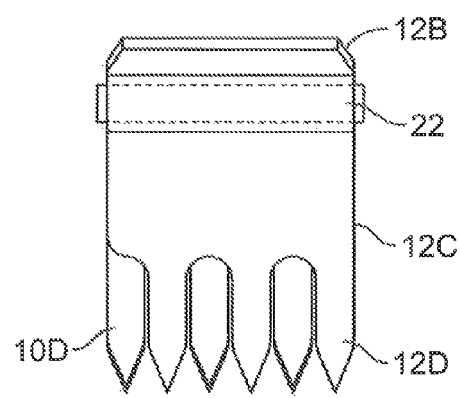
Figure 4C:
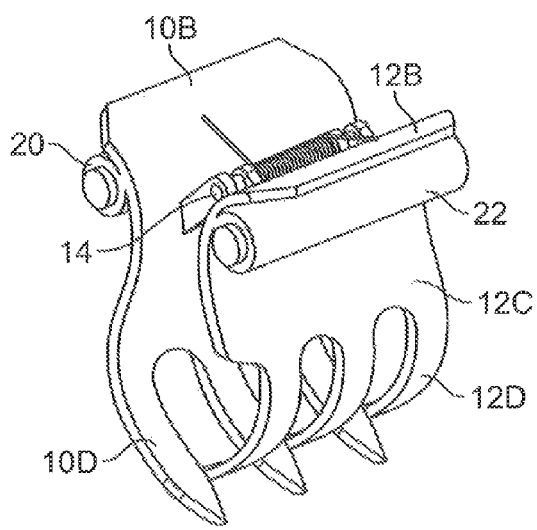
Figure 4D:
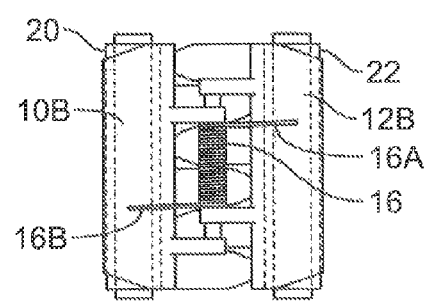
Figure 5A:
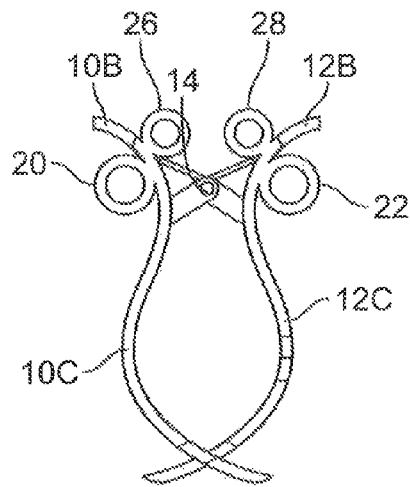
FIGS. 5A, 5B, 5C and 5D illustrate a device similar to that shown in FIGS. 4A, 4B, 4C and 4D with both the inner and outer upper walls of the clip incorporating weight holder portions.
Figure 5B:
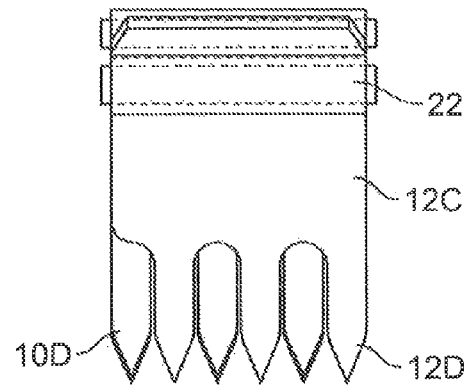
Figure 5C:
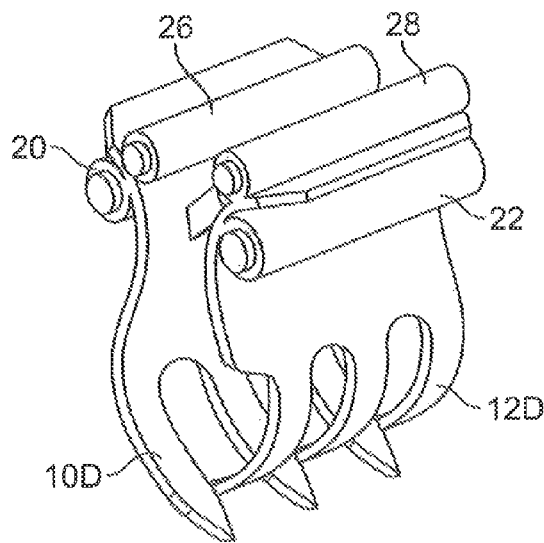
Figure 5D:
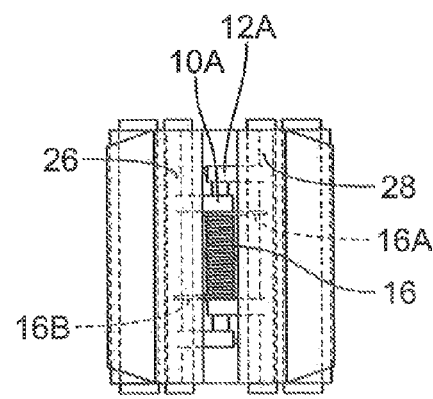

Referring to FIG. 1A there is shown the front view of the butterfly clip B device consisting of two half sections 10, 12 of the butterfly clip each having inwardly directed wall portions 10A, 12A that are pivotably interconnected by a pin 14 extending between aligned openings defined by the flanges 10A, 12A. A spring 16 disposed about the pin 14 includes outwardly extending sections 16A, 16B that are resiliently pressed against the upper and outwardly extending portions of the sections 10B, 12B of the sections 10, 12 to bias the lower portions 10C, 12C of the sections 10, 12 toward each other. The lower portions 10C, 12C include spaced intertwining fingers 10D, 12D that define the opening 18 for the finger about which the clip B is disposed.

The sections 10, 12 each include cylindrical weight holders 20, 22 and 24 for receiving weights for the finger weight device. Also included in this embodiment is a centrally disposed weight holder 24 located in conjunction with the pivot pin to receive a third weight.

To locate the clip on the finger the upwardly extending portions 10B, 12B are moved toward each other against the action of the spring 16 to spread apart the finger portions 10D, 12D to permit the clip to be located about a finger. When the portions 10B, 12B are released the finger portions will be securely and resiliently in place about a finger.

The embodiments in FIGS. 2, 3, 4, and 5 are similar to that shown in FIG. 1 with the difference being in the number and positioning of the finger weights. The common portions of the various embodiments are identified with the same numbers.

FIG. 2 is similar to FIG. 1 but instead of three weights being employed only one is used. The single weight holder is located above the spring and pivot pin connection.

In FIG. 3 the single weight holder 24 is located in the pivot pin area.

FIG. 4 illustrates an embodiment in which the only weight holders 20, 22 are those located on the underside of the outwardly extending wall portions 10B, 12B.

The FIG. 5 embodiment is similar to that shown in FIG. 4 but employing additional weight holders 26, 28 on the inner walls of the outwardly extending portions 10B, 12B.

The FIG. 6 embodiment is similar to the above but employs a center spring 16 disposed to about a center weight 32. The center spring 16 includes outwardly extending sections 16A, 16B that are resiliently pressed against the inwardly extending portions of the sections 10A, 12A of the sections 10, 12 to bias the lower portions 10C, 12C of the sections 10, 12 toward each other. The sections 10, 12 each include side cylindrical weight holders 20, and 22 for receiving weights 30 for the finger weight device. Also included in this embodiment is a centrally disposed weight holder 24 located in conjunction with the pivot to receive a third weight for which the spring is positioned thereon.

In addition, the center weight could be positioned above the center spring 16, by positioning the spring around a pin and including a center weight holder above the pin. Furthermore, the spring or pivot may be a living hinge molded into a single one-piece clip device.

As provided herein there is devised a finger weight device. The device includes two arcuate jaws. Each jaw has a lower portion with tines extending therefrom, the two arcuate jaws being connected together at an upper portion by a hinge, and wherein the arcuate jaws have an inwardly facing surface configured to enclose around a finger of a person. A spring is positioned at the hinge and configured to urge the tines towards each other such that the inwardly facing surface of the arcuate jaws secure the device about the finger of the person. Each of the jaws has an arcuate handle extending from the upper portion opposite the tines, which when moved towards each other, against a force of the spring, causes the tines to separate from each other, allowing the device to be removed from the figure of the person. In addition, at least one weight receiving portion, and at least one weight corresponding to the weight receiving portion is provided for adding a desired weight to the device.

In various embodiments, the weight receiving portion may be a bore centered about the hinge and running parallel to a longitudinal axis of the hinge.

Alternatively, the at least one weight receiving portion may include a pair of receiving portions separately positioned on an exterior surface of the upper portion of the arcuate jaws. In such embodiments, the at least one weight receiving portion may further comprise a third receiving portion centered about the hinge and running parallel to a longitudinal axis of the hinge. Similarly, the at least one weight receiving portion may further comprise a second pair of receiving portions separately positioned on an interior facing surface of the arcuate handles.

In other embodiment, the at least one weight receiving portion is a first centered opening disposed about the hinge such that the weight once received in the centered opening is configured to cause the spring to be disposed about the weight. In this embodiment, the at least one weight receiving portion may further comprise a pair of receiving portions separately positioned on an exterior surface of the upper portion of the arcuate jaws and wherein the pair of receiving portions are substantially parallel to the first centered opening.

From the foregoing and as mentioned above, it will be observed that numerous variations and modifications may be effected without departing from the spirit and scope of the novel concept of the invention. It is to be understood that no limitation with respect to the specific methods and apparatus illustrated herein is intended or should be inferred. It is, of course, intended to cover by the appended claims all such modifications as fall within the scope of the claims.

We claim:

1. A finger weight device comprising:

two arcuate jaws, each jaw having a lower portion with tines extending therefrom, the two arcuate jaws being connected together at an upper portion by a hinge, and wherein the arcuate jaws have an inwardly facing surface configured to enclose around a finger of a person;

a spring positioned at the hinge and configured to urge the tines towards each other such that the inwardly facing surface of the arcuate jaws secure the device about the finger of the person;

each of the jaws having an arcuate handle extending from the upper portion opposite the tines, which when moved towards each other, against a force of the spring, causes the tines to separate from each other, allowing the device to be removed from the figure of the person; and at least one weight receiving portion, and at least one weight corresponding to the weight receiving portion for adding a desired weight to the device, and wherein the arcuate handle of each arcuate jaw includes an inside surface that is configured towards the other arcuate jaw when the arcuate handles are moved towards each other to separate the tines and the arcuate handle of each arcuate jaw further includes an outside surface that is configured as an exterior to the arcuate jaw when the arcuate handles are moved towards each other to separate the tines; and wherein each outside surface on the arcuate handles includes a weight receiving portion, of the at least one weight receiving portion, and said weight receiving portion configured to receive the weight, of the at least one weight.

2. The device of claim 1, wherein the at least one weight receiving portion is a bore centered about the hinge and running parallel to a longitudinal axis of the hinge.

3. The device of claim 1, wherein the at least one weight receiving portion further comprises a third receiving portion centered about the hinge and running parallel to a longitudinal axis of the hinge.

4. The device of claim 1, wherein the at least one weight receiving portion further comprises a second pair of receiving portions separately positioned on the inside surface of the arcuate handles.

5. The device of claim 1, wherein the at least one weight receiving portion further includes a first centered opening disposed about the hinge such that the weight once received in the centered opening is configured to cause the spring to be disposed about the weight.

* * * * *